(12) United States Patent
Thompson et al.

(10) Patent No.: US 9,323,943 B2
(45) Date of Patent: Apr. 26, 2016

(54) DECRYPT AND ENCRYPT DATA OF STORAGE DEVICE

(71) Applicant: Hewlett-Packard Development Company, L.P., Fort Collins, CO (US)

(72) Inventors: Mark J. Thompson, Spring, TX (US); Jeffrey A Plank, Cypress, TX (US); Michael White, Houston, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 136 days.

(21) Appl. No.: 13/874,322

(22) Filed: Apr. 30, 2013

(65) Prior Publication Data

US 2014/0325235 A1 Oct. 30, 2014

(51) Int. Cl.
*H04L 29/06* (2006.01)
*G06F 21/62* (2013.01)

(52) U.S. Cl.
CPC .... *G06F 21/6218* (2013.01); *G06F 2221/2107* (2013.01)

(58) Field of Classification Search
CPC ..... G06F 12/1408; G06F 21/10; G06F 21/30; G06F 21/60; H04L 9/14
See application file for complete search history.

(56) References Cited

U.S. PATENT DOCUMENTS

| | | | |
|---|---|---|---|
| 2007/0256142 A1 | 11/2007 | Hartung et al. | |
| 2008/0260159 A1* | 10/2008 | Osaki | 380/277 |
| 2009/0049311 A1* | 2/2009 | Carlson et al. | 713/193 |
| 2012/0079289 A1 | 3/2012 | Weng et al. | |
| 2012/0179919 A1* | 7/2012 | Farrugia et al. | 713/193 |
| 2012/0278635 A1* | 11/2012 | Hars et al. | 713/193 |

OTHER PUBLICATIONS

Kearns, Dave. "Seven strong authentication methods". Mar. 28, 2007. p. 1-3.*
Diesburg, S.M. et al., A Survey of Confidential Data Storage and Deletion Methods, (Research Paper), Nov. 2010, vol. 43, No. 1.

* cited by examiner

*Primary Examiner* — Fatoumata Traore
*Assistant Examiner* — Kendall Dolly
(74) *Attorney, Agent, or Firm* — Hewlett Packard Enterprise Patent Department

(57) ABSTRACT

Data read from a volume is decrypted using a first key. The decrypted data is encrypted using a second key. The encrypted data is written back to the volume. An access request to a location of the volume is received from a host. Data is encrypted to or decrypted from the location using the first or second key, in response to the access request. The first key is used for the access request if the location has not been decrypted using the first key and encrypted using the second key. The second key is used for the access request if the location has been decrypted using the first key and encrypted using the second key.

14 Claims, 5 Drawing Sheets

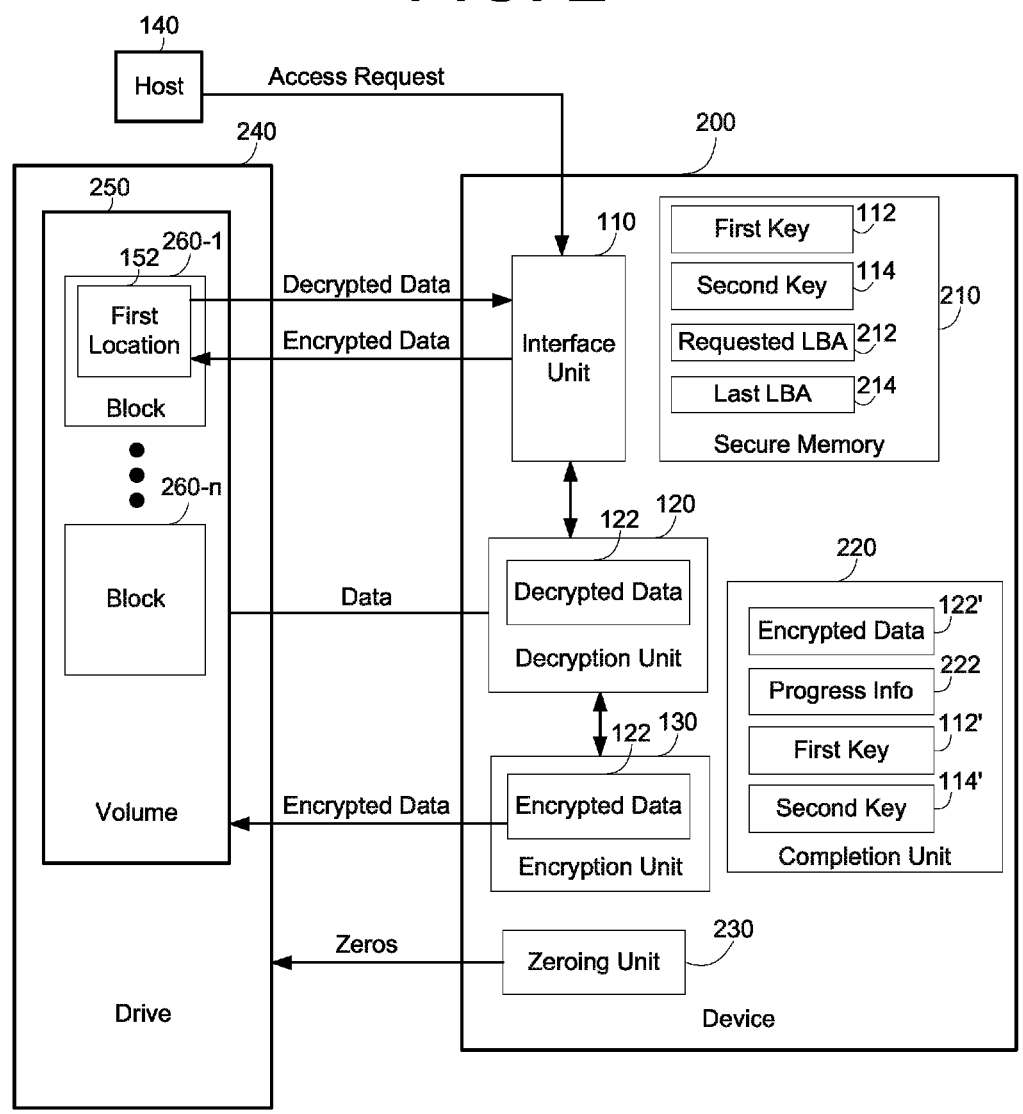

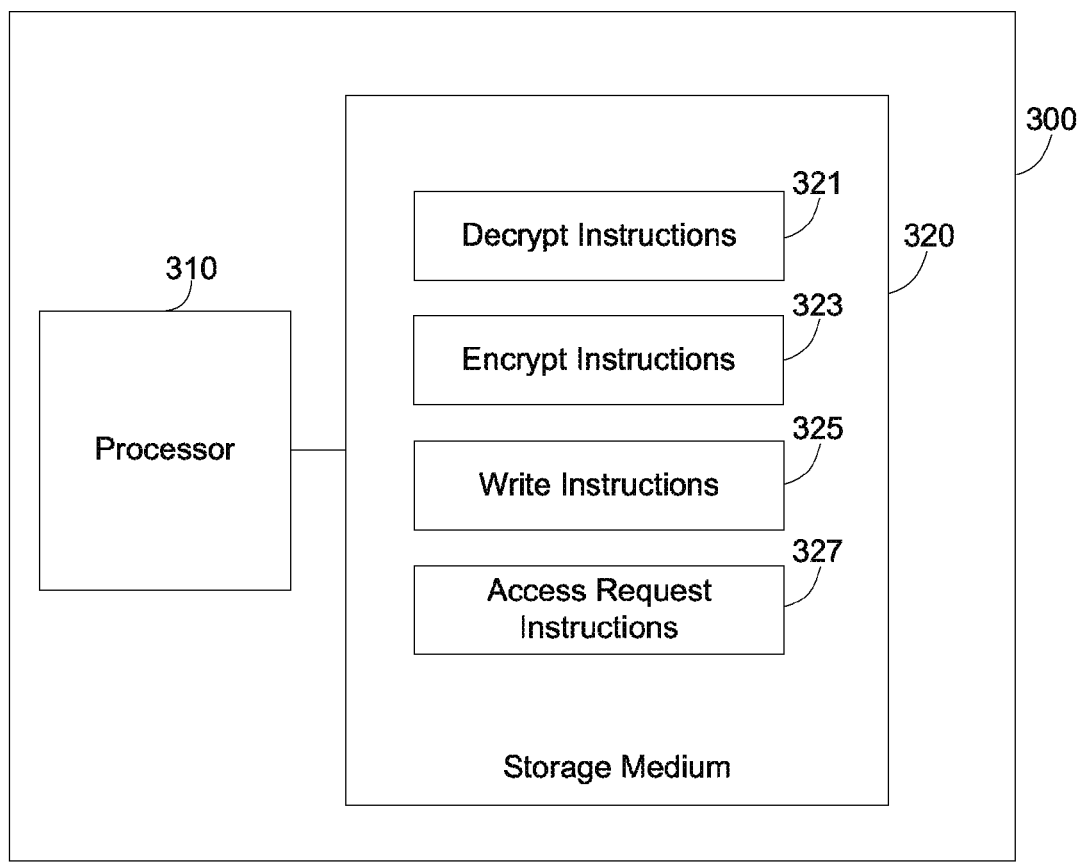

1

DECRYPT AND ENCRYPT DATA OF STORAGE DEVICE

BACKGROUND

Storage device controllers may decrypt and/or encrypt data to be read from and/or written to a data volume spanning one or more physical drives. Physical drives may be repurposed without all existing data being zeroed.

BRIEF DESCRIPTION OF THE DRAWINGS

The following detailed description references the drawings, wherein:

FIG. 2 is another example block diagram of a device to decrypt and encrypt data of a volume;

FIG. 3 is an example block diagram of a computing device including instructions for decrypting and encrypting data of a volume.

DETAILED DESCRIPTION

Figure 1:
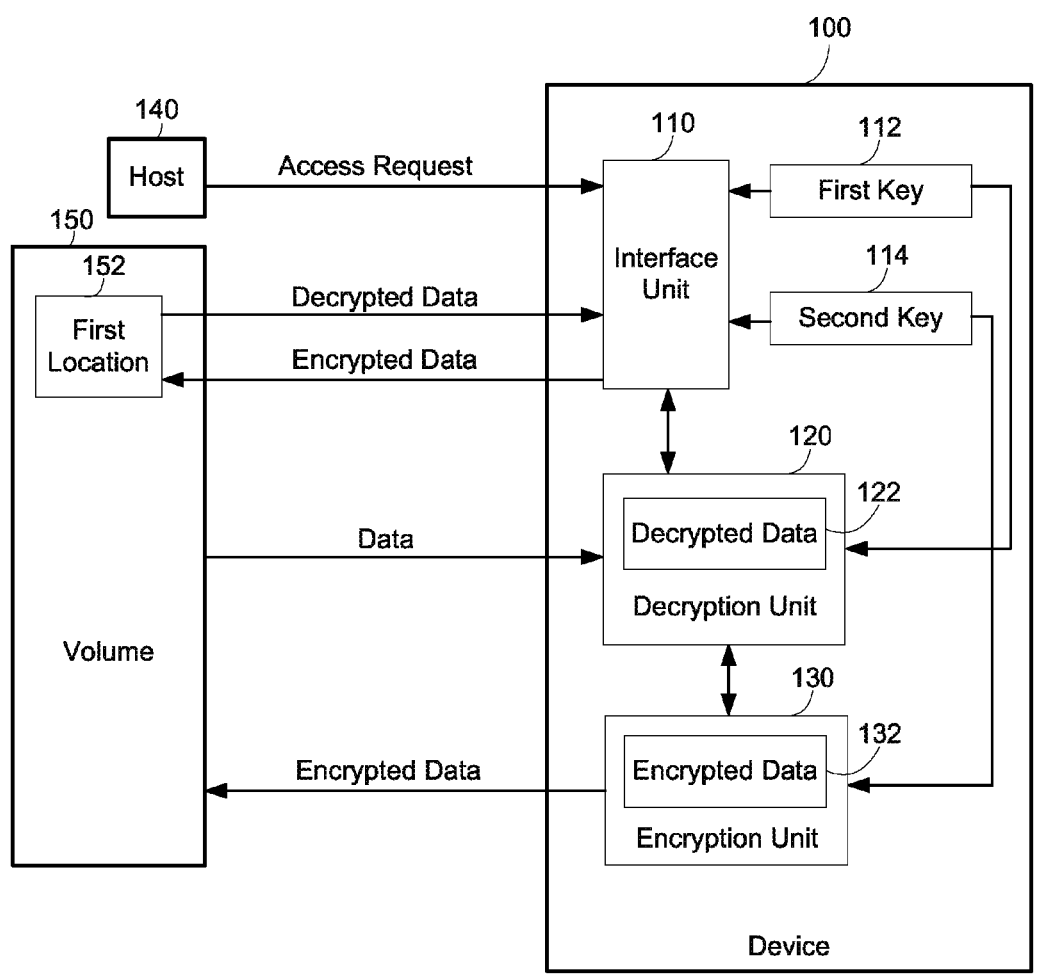
FIG. 1 is an example block diagram of a device to decrypt and encrypt data of a volume.

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

Storage devices, such as physical drives may be repurposed and/or used with different types of storage device controllers. Some types of storage device controllers may encrypt data to be written to a volume or storage device while other types of storage device controllers may write in plaintext data to the volume or storage device. Thus, a situation may arise where a drive is switched from a non-encrypting storage device controller to an encrypting storage device controller. In this case, any new data to be written to a volume of the drive may be encrypted by the encrypting storage device controller. However, old data within the volume may still exist in non-encrypted form, such as plaintext data. Yet zeroing the entire drive or volume beforehand may prove too costly and/or time prohibitive.

Examples of the present technique may iteratively encrypt all plaintext data on a drive via a background process while allowing for new encrypted data to be simultaneously written to the drive. In an example, a device may include an interface unit, a decryption unit and an encryption unit. The decryption unit may read data from an entire volume and decrypt the read data using a first key. The encryption unit may encrypt the decrypted data using a second key and write the data encrypted by the second key back to the volume. The interface unit may receive an access request to a location of the volume from a host while the decryption unit decrypts the read data and the encryption unit encrypts the decrypted data. The interface unit may encrypt data to and/or decrypt data from the location using the second key in response to the access request, if the location of the volume stores the data encrypted by the second key. The interface unit may encrypt data to and/or decrypt data from the location using the first key in response to the access request, if the location of the volume does not store the data encrypted by the second key.

Thus, examples may allow for two separate processes to operate simultaneously and independently. A first process may iteratively encrypt or scramble any preexisting plaintext data of the volume while a second process may decrypt data from or encrypt new data to the volume based on an access request from a host. Nonetheless, the second process may track a progress of the first process in order to determine which of first and second keys to use. Further, one of the first and second processes may need to determine if a location to be accessed is currently locked by another of the first and second processes.

Referring now to the drawings, FIG. 1 is an example block diagram of a device 100 to decrypt and encrypt data of a volume 150. The device 100 may couple to or be included in any type of computing device or controller that interfaces with a memory, such as a secure microprocessor, a storage device controller, a notebook computer, a desktop computer, an all-in-one system, a server, a network device, a wireless device and the like. In the example of FIG. 1, device 100 interfaces with a host 140 and the volume 150. For example, the device 100 may communicate with the volume 150 via a Serial Attached SCSI (SAS) connection and may communicate with the host 140 via a Peripheral Component Interconnect (PCI) connection, Ethernet or IP protocol connection.

The host 140 may refer to any type of device that seeks to access the volume 150, such as a main processor of a computer or a computer connected to a computer network. The volume 150 may be included in any electronic, magnetic, optical, or other physical storage device that stores data, such as a hard disk drive (HDD), solid-state drive (SSD) and the like. For example, the volume 150 may be one or more logical data volumes spanning one or more of the physical drives (not shown) of a storage device.

In FIG. 1, the device 100 is shown to include an interface unit 110, a first key 112, a second key 114, a decryption unit 120 and an encryption unit 130. The interface, decryption and encryption units 110, 120 and 130 may include, for example, a hardware device including electronic circuitry for implementing the functionality described below, such as control logic and/or memory. In addition or as an alternative, the interface, decryption and encryption units 110, 120 and 130 may be implemented as a series of instructions encoded on a machine-readable storage medium and executable by a processor.

The decryption unit 120 may read data from the entire volume 150 and decrypt the read data using a first key 112. For example, the decryption unit 120 may iteratively read and the decrypt the read data location-by-location of the volume 150. A location, such as first location 152, may include one or more blocks and a block may include one or more sectors. A sector may define a fixed amount of user-accessible data, such as a subdivision of a track on a magnetic disk or optical disc. For instance, a sector may stores 512 or 4096 bytes for hard drives and 2048 bytes for CD-ROMs and DVD-ROMs. In one example, the decryption unit 120 may start reading and decrypting from a lowest logical block address (LBA) of the volume 150 and incrementally progress to a highest LBA of the volume 150.

The encryption unit 130 may encrypt the decrypted data 122 using a second key 114 and write the data encrypted 132 by the second key 114 back to the volume 150. For example, the encryption unit 130 data of the first location 152 may be decrypted by the decryption unit 122 using the first key 112, then encrypted by the encryption unit 130 using the second key 114, and finally written back to the same first location 152, thus overwriting the original data.

Encryption may refer to a process of encoding data in such a way that unauthorized parties may not decipher the data while decryption may refer to a process of decoding data in such a way that only authorized parties may decipher the data. A key, such as the first and second keys 112 and 114 may specify how data is to be encoded or decoded. For instance, the key may be a piece of information or parameter that determines a functional output of a cryptographic algorithm. Here, the first and second keys 112 may be different such that the first key 112 cannot be used to encode/decode data that has been encoded/decoded by the second key 114 using a same cryptographic algorithm, and vice versa.

The cryptographic algorithm may be a symmetric or asymmetric key algorithm. Examples of symmetric algorithms include Twofish, Serpent, AES (Rijndael), Blowfish, CAST5, Rivest Cipher 4 (RC4), Triple Data Encryption Algorithm (3DES), International Data Encryption Algorithm (IDEA) and the like. Examples of asymmetric algorithms include Diffie-Hellman key exchange protocol, Digital Signature Standard (DSS), ElGamal, Paillier cryptosystem, RSA encryption algorithm and Cramer-Shoup cryptosystem, and the like. These algorithms may include a procedure for performing encryption or decryption.

The first key 112 may be discarded after the encryption unit 130 encrypts all of the volume 150. While the encryption and decryption units 120 and 130 are steadily decrypting and encrypting the volume 150, the interface unit 110 may simultaneously receive an access request to the first location 152 of the volume 150 from the host 140. The interface unit 110 may also receive the access request before or after the encryption and decryption units 120 and 130 have started or finished decrypting and encrypting the volume 150.

The interface unit 110 may encrypt data to and/or decrypt data from the first location 152 in response to the access request, via the decryption and/or encryption units 120 and 130. For example, the interface unit 110 may encrypt data to and/or decrypt data from the first location 152 using the second key in response to the access request, if the first location 152 of the volume 150 already stores the data encrypted by the second key 114. However, the interface unit 110 may encrypt data to and/or decrypt data from the first location 152 using the first key 112 in response to the access request, if the first location 152 of the volume 150 does not store the data encrypted by the second key 114.

The access request may be read or write request. So the interface unit 110 may cause data to be encrypted to the first location 152 for the write request and cause data to be decrypted from the first location 152 for the read request. Further, at least some of the data read and to be decrypted using the first key by the decryption unit 120 may be plaintext data. The term plaintext may refer to an unaltered representation of data before any action has been taken to conceal, compress, or modify it in another manner. The term plaintext does not necessarily refer to text nor data that is plain. The plaintext data may be scrambled when decrypted by the decryption unit 122, as the plaintext was not encrypted beforehand.

Thus, the decryption and encryption units 120 and 130 may autonomously decrypt and then encrypt an entirety of a newly introduced volume 150 to the device 100, such as via a background process. In doing so, any data on the volume 150 that was previously encrypted using the first key 112 may be re-encrypted using the second key 114. Further, any data on the volume 150 that was previously plaintext data may become scrambled and undecipherable, such as once the first key 112 is discarded. Accordingly, if the volume 150 had been formed on a previously used drive holding old data, at least some of the old data may be scrambled so as to prevent or reduce the likelihood of this old data being read by unauthorized parties. For example, a first party may have stored private user data in plaintext form on the volume 150. Then, the volume 150 may have been repurposed for use by a second party that should not have access to the private user data. This private user data will then be scrambled and thus protected when decrypted using the first key 112. On the other hand, if the volume 150 holds any old data that was encrypted using the first key 112, which should be accessible to the second party, this data may still be decrypted by the second party using the second key 114 after this data is first decrypted using the first key 112 and then encrypted using the second key 114.

Moreover, for any data requested to be written to or read from the volume 150, the LBA of the requested data (not shown) may simply be compared to the LBA last encrypted using the first key 112 and decrypted using the second key 114 (not shown) by the decryption and encryption units 120 and 130. For example, if the requested LBA is greater than the last LBA, this infers that the requested LBA has not yet been decrypted using the first key 112 and then encrypted using the second key 114. However, if the requested LBA is less than or equal to the last LBA this infers that the requested LBA has already been decrypted using the first key 112 and then encrypted using the second key 114.

Thus, as explained above, the requested data is written to or read from the volume 150 using the first key 112, if the requested LBA is greater than the last LBA, so that the requested data may later be decrypted using the first key 112 and then re-encrypted using first key 112, by the background process of the of the decryption and encryption units 120 and 130. Yet, the requested data is written to or read from the volume 150 using the second key 114, if the requested LBA is less than or equal to the last LBA, as the data at the requested LBA has already been re-encrypted using second key 114 by the background process of the of the decryption and encryption units 120 and 130, thus rendering the first key 112 irrelevant here.

FIG. 2 is another example block diagram of a device 200 to decrypt and encrypt data of a volume 250. The device 200 may couple to or be included in any type of computing device or controller that interfaces with a memory, such as a secure microprocessor, a storage device controller, a notebook computer, a desktop computer, an all-in-one system, a server, a network device, a wireless device and the like.

The device 200 of FIG. 2 may include at least the functionality and/or hardware of the device 100 of FIG. 1. For example, the device 200 of FIG. 2 includes the interface unit 110, the decryption unit 120 and the encryption unit 130 of the device 200 of FIG. 1. The device 200 further includes a secure memory 210, a completion unit 220 and a zeroing unit 230. A volume 250 included in a drive 240 may have at least the functionality and/or hardware of the volume 150 of FIG. 1. Similar to FIG. 1, the device 200 also interfaces with the host 140 and the volume 250 via the drive 240.

The secure memory 210, completion unit 220 and zeroing unit 230 may include, for example, a hardware device including electronic circuitry for implementing the functionality described below, such as control logic and/or memory. In addition or as an alternative, the secure memory 210, completion unit 220 and zeroing unit 230 may be implemented as a series of instructions encoded on a machine-readable storage medium and executable by a processor. The storage medium may also store data.

In FIG. 2, the logical volume 250 is shown to span the physical drive 240, but embodiments may also include the volume 250 spanning a plurality of the drives 240. Further, the volume 250 is shown to include a plurality of data blocks 260-1 to 260-n, where n is a natural number, with the first block 260-1 to hold the first location 152. The first key 112 and or second key 114 may be different or modified throughout the volume 250. For example, the first key 112 and/or second key 114 may be modified based on the location 152, block 260 and/or sector (not shown) of the volume 250. In one instance, the LBA may used as an input for modifying the first key 112 and/or second key 114, such that a different first key 112 and/or second key 114 may used for each block 260 of the volume 250. While FIG. 2 shows only one volume 250, embodiments may include a plurality of volumes 250. Further, the first and second keys 112 and 114 may be different for different volumes 250.

The completion unit 220 may record to a non-volatile memory (not shown) various types of status information. For example, the completion unit 220 may store the encrypted data 122' before the encrypted data 122' is written back to the volume 250, progress information 222 and the first and second keys 112' and 114'. The progress information 222 may relate to which of the locations, LBAs, etc., of the volume 250 have been encrypted using the second key 114. Thus, the device 200 may be able to reference the completion unit 220 after a power failure occurs but before the encryption unit 130 had encrypted all of the blocks 260-1 to 260-n of the volume 250. Thus, the device 200 may be able to resume operations from a point at which the power failure occurred in order to complete encrypting an entirety of the volume 250.

The zeroing unit 230 may iteratively write zero any locations not included in a volume of one or more drives. For example, the zeroing unit 230 may write zeros to any locations of the drive 240 that are not included in the volume 250, but the zeroing unit 230 may not write zero to any locations of the volume 250 itself. This is because the decryption and encryption units 120 and 130 may scramble any plaintext data located within the volume 250 but not scramble any plaintext data or other type of sensitive data located outside of the volume 250. Thus, by zeroing any data located outside the volume 250, the zeroing unit 230 may erase any remaining old data, such as private user data, on the drive 240. While the zeroing unit 230 is described as writing only zeros, embodiments of the zeroing unit 230 may also overwrite locations with non-zero data, such as any type of combination or pattern of ones and zeros.

The secure memory 210 is shown to store first and second keys 112 and 114 as well as a requested LBA 212 and a last LBA, as described above with respect to FIG. 1. Information of the secure memory 210, such as the first and second keys 112 and 114 may require authentication in order to be accessed, thus preventing or reducing a likelihood of unauthorized access to private data.

FIG. 3 is an example block diagram of a computing device 300 including instructions for decrypting and encrypting data of a volume. In the embodiment of FIG. 3, the computing device 300 includes a processor 310 and a machine-readable storage medium 320. The machine-readable storage medium 320 further includes instructions 321, 323, 325 and 327 for decrypting and encrypting the data of the volume.

The computing device 300 may be, for example, a secure microprocessor, a notebook computer, a desktop computer, an all-in-one system, a server, a network device, a wireless device, or any other type of user device capable of executing the instructions 321, 323, 325 and 327. In certain examples, the computing device 300 may include or be connected to additional components such as memories, sensors, displays, etc.

The processor 310 may be, at least one central processing unit (CPU), at least one semiconductor-based microprocessor, other hardware devices suitable for retrieval and execution of instructions stored in the machine-readable storage medium 320, or combinations thereof. The processor 310 may fetch, decode, and execute instructions 321, 323, 325 and 327 to implement decrypting and encrypting the data of the volume. As an alternative or in addition to retrieving and executing instructions, the processor 310 may include at least one integrated circuit (IC), other control logic, other electronic circuits, or combinations thereof that include a number of electronic components for performing the functionality of instructions 321, 323, 325 and 327.

The machine-readable storage medium 320 may be any electronic, magnetic, optical, or other physical volume that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for decrypting and encrypting the data of the volume.

Moreover, the instructions 321, 323, 325 and 327 when executed by a processor (e.g., via one processing element or multiple processing elements of the processor) can cause the processor to perform processes, such as, the process of FIG. 4. For example, the decrypt instructions 321 may be executed by the processor 310 decrypt data read from a volume (not shown) iteratively using a first key (not shown) until an entirety of the volume is decrypted using the first key. The data read from the volume that is decrypted may include plaintext data. The encrypt instructions 323 may be executed by the processor 310 encrypt the decrypted data using a second key (not shown).

The write instructions 325 may be executed by the processor 310 write the encrypted data back to the volume. The access request instructions 327 may be executed by the processor 310 at least one of encrypt data to and decrypt data from a location of the volume requested by an access request from a host (not shown) using at least one of the first and second keys. For example, the first key may be used in response to the access request if the location has not been decrypted using the first key and encrypted using the second key. On the other hand, the second key may be used in response to the access request if the location has been decrypted using the first key and encrypted using the second key. The first key may be discarded after all blocks of the volume are decrypted using the first key and encrypted using the second key via the encrypt and decrypt instructions 321 and 323.

Figure 4A:
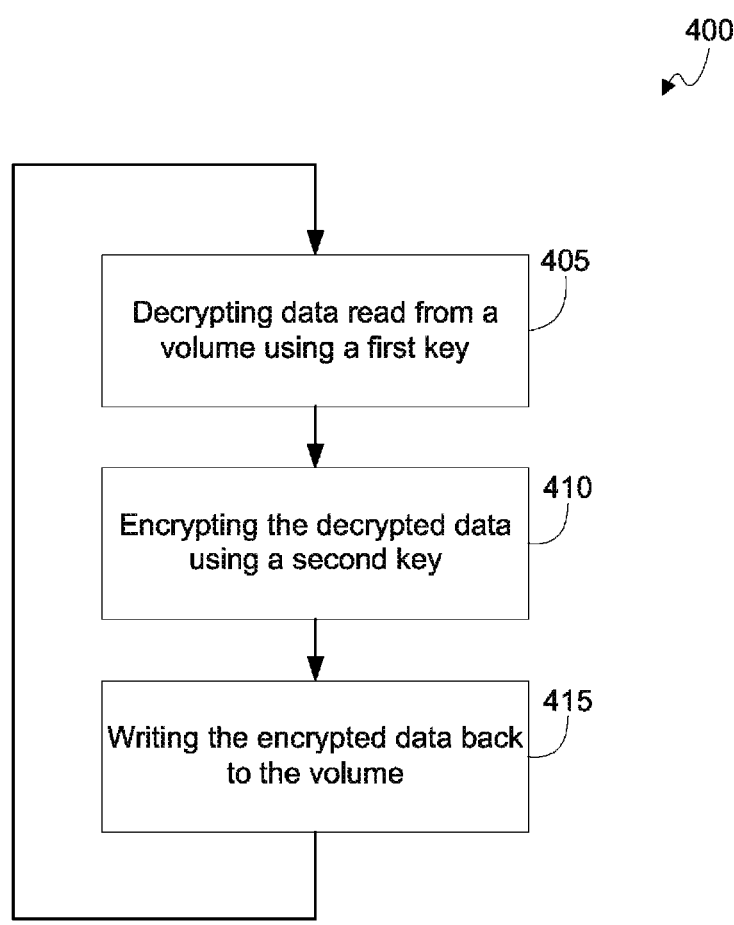
FIGS. 4A and 4B are an example flowchart of a method for decrypting and encrypting data of a volume.
Figure 4B:
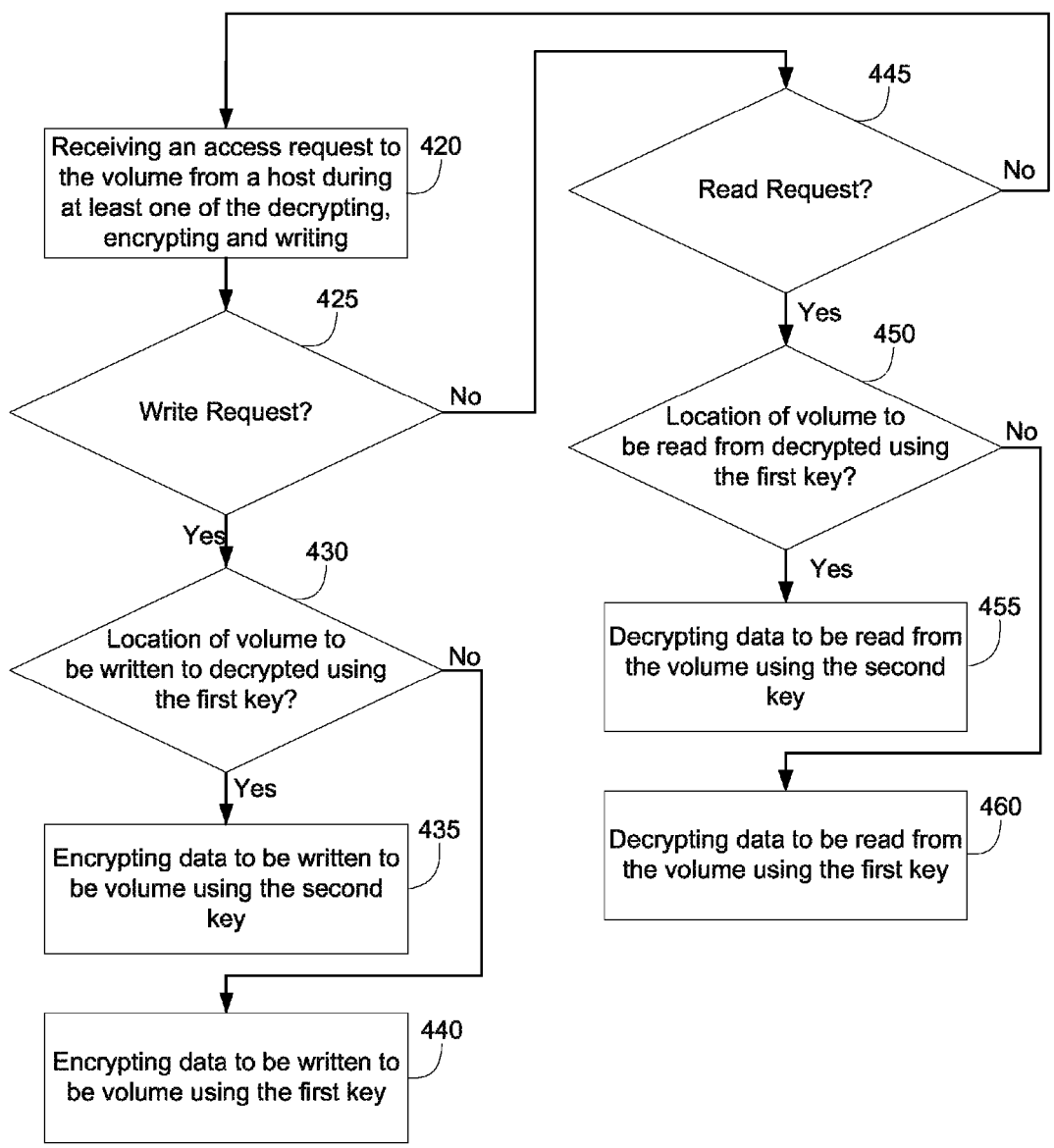

FIGS. 4A and 4B are an example flowchart of a method 400 for decrypting and encrypting data of a volume. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 405, the device 200 decrypts data read from a volume 250 using a first key 112. At least some of the data read from the volume 250 may be plaintext data. At least some the data decrypted at block 405 may be plaintext data. Thus, the plaintext data may be scrambled by the decryption process at block 405. Then, at block 410, the device 200 encrypts the decrypted data using a second key 114. Next, at block 415, the device 200 writes the encrypted data back to the volume 250. Then, the method 400 may proceed back to block 400 and continue to repeat until the process of blocks 405, 410 and 415 and have been repeated for all of the volume 250. For instance, this process may begin at a lowest LBA or block 260 of the volume 250, and continue block-by-block from the lowest LBA to the highest LBA of the volume 250. Further, the first key 112 may be discarded after all of the blocks 260-1 to 260-n of the volume 250 have been decrypted using the first key 122 by the decrypting at block 405 and encrypted using the second key by the encrypting at block 410. The scrambled plaintext data may not be deciphered after the first key 112 is discarded.

While the first process of blocks 405, 410 and 415 is occurring in FIG. 4A, a second process of FIG. 4B may simultaneously occur, which includes blocks 420, 425, 430, 435, 440, 445, 450, 455 and 460. Moreover, the second process of FIB. 4B may also occur before or after the first process of FIG. 4A. At block 420, the device 200 receives an access request to the volume 250 from a host 140, such as during at least one of the decrypting, encrypting and writing occurring at blocks 405, 410 and 415. Then, the method 400 proceeds to block 425, to determine if the access request is a write request. If the access request is a write request, the method 400 proceeds to block 430 to determine if a location 152 of the volume 250 to be written to has been decrypted using the first key 112, such as by block 405.

For instance, the device 200 may store the LBA 212 up to which the first process including blocks 405, 410 and 415 has progressed and compare the stored LBA 212 to an LBA of the location requested by the access request. If the stored LBA 212 is greater than the requested LBA, the device 200 may determine that the location 152 of the access request has been decrypted using the first key 112, such as by block 405. Conversely, if the stored LBA 212 is less than or equal to the requested LBA, the device 200 may determine that the location 152 of the access request has not yet been decrypted using the first key 112, such as by block 405.

Returning to block 430, if the device 200 determines that the location 152 of the volume 250 to be written to has been decrypted using the first key 112, the method 400 proceeds from block 430 to block 435, where the device 200 encrypts data to be written to the volume 250 using the second key 114. On the other hand, if the device 200 determines that the location 152 of the volume 250 to be written to has not yet been decrypted using the first key 112, the method 400 proceeds from block 430 to block 440, where the device 200 encrypts data to be written to the volume 250 using the first key 112.

Returning to block 425, if the access request is not a write request, the method 400 proceeds to block 445 to determine if the access request is read request. If the access request is not a read request either, the method 400 may proceed back to block 420 and the device 200 may handle the access request according to another process (not shown). However, if the access request is a read request, the method 400 may proceed from block 445 to 450 to determine if the location 152 of the volume 250 to be read from has been decrypted using the first key 112, such as by block 405.

If the device 200 determines that the location 152 of the volume 250 to be read from has been decrypted using the first key 112, the method 400 proceeds from block 450 to block 455, where the device 200 decrypts the data to be read from the volume 250 using the second key 114. On the other hand, if the device 200 determines that the location 152 of the volume 250 to be read from has not yet been decrypted using the first key 112, the method 400 proceeds from block 450 to block 460, where the device 200 decrypts data to be read from the volume 250 using the first key 112.

According to the foregoing, techniques may provide a method and/or device for iteratively encrypting all plaintext data of a volume via a first process while allowing for new encrypted data to be simultaneously written to the drive via second process. Thus, an existing drive may be dynamically repurposed for new uses related to encryption without having to first zero or reformat the entire drive to clear old plaintext data.

We claim:

1. A device, comprising:
a decryption unit to read data from an entire volume and decrypt the read data using a first key, wherein the volume includes a plurality of blocks and the first key is to be different for at least two of the blocks based on a logical block address (LBA) of the block, and wherein the decryption unit comprises electronic circuitry for implementing functionality;
an encryption unit to encrypt the decrypted data using a second key and to write the data encrypted by the second key back to the volume, wherein at least one of the first and second keys are to be different for different volumes included in one or more drives, and wherein the encryption unit comprises electronic circuitry for implementing the functionality; and
an interface unit to receive an access request to a location of the volume from a host while the decryption unit decrypts the read data and the encryption unit encrypts the decrypted data, wherein
the interface unit comprises electronic circuitry for implementing the functionality; the interface unit is to at least one of encrypt data to and decrypt data from the location using the second key in response to the access request, if the location of the volume stores the data encrypted by the second key, and
the interface unit is to at least one of encrypt data to and decrypt data from the location using the first key in response to the access request, if the location of the volume does not store the data encrypted by the second key.

2. The device of claim 1, wherein,
the access request is at least one a read and write request,
at least some of the data read by the decryption unit is plaintext data, and
the plaintext data is scrambled when decrypted by the decryption unit.

3. The device of claim 1, wherein the electronic circuitry of any of the units comprises a machine-readable storage medium encoded with instructions executable by a processor.

4. The device of claim 1, wherein,
the second key is to be different for at least two of the blocks based on at least one of a logical block address (LBA) of the block.

5. The device of claim 1, wherein,
the decryption unit is to read and decrypt the data iteratively from the volume, and one or more blocks of the volume are at least one of read and decrypted per iteration.

6. The device of claim 1, further comprising:
a completion unit to record to a non-volatile memory at least one of the encrypted data before the encrypted data is written back to the volume, progress information, and the first and second keys, wherein
the completion unit comprises electronic circuitry for implementing functionality,
the progress information relates to which of the locations of the volume have been encrypted using the second key, and
the device is to reference the completion unit if a power failure occurs before the encryption unit encrypts all blocks of the volume.

7. The device of claim 1, further comprising:
a zeroing unit to iteratively write zero any locations not included in a volume of one or more drives, wherein
the zeroing unit comprises electronic circuitry for implementing functionality,
the zeroing unit is to not write zero to any locations of the volume.

8. The device of claim 1, wherein the first key is discarded after the encryption unit encrypts all of the volume.

9. The device of claim 1, wherein the first and second keys are stored in a secure memory that requires authentication to access the first and second keys.

10. A method, comprising:
decrypting data read from a volume using a first key, wherein the volume includes a plurality of blocks and the first key is to be different for at least two of the blocks based on a logical block address (LBA) of the block;
encrypting the decrypted data using a second key, wherein at least one of the first and second keys are to be different for different volumes included in one or more drives;
writing the encrypted data back to the volume;
receiving an access request to the volume from a host during at least one of the decrypting, encrypting and writing;
encrypting data to be written to the volume using the first key in response to the access request, if the access request is a write request and a location of the volume to be written to has not been decrypted using the first key;
decrypting data to be read from the volume using the first key in response to the access request, if the access request is a read request and the location of the volume to be read from has not been decrypted using the first key;
encrypting data to be written to the volume using the second key in response to the access request, if the access request is a write request and the location of the volume to be written to has been decrypted using the first key; and
decrypting data to be read from the volume using the second key in response to the access request, if the access request is a read request and the location of the volume to be read from has been decrypted using the first key.

11. The method of claim 10, wherein the first key is discarded after all blocks of the volume are decrypted using the first key by the decrypting and encrypted using the second key by the encrypting.

12. The method of claim 11, wherein,
at least some of the data read from the volume is plaintext data,
at least some the data decrypted by the decrypting is plaintext data,
the plaintext is scrambled by the decrypting, and
the scrambled plaintext data cannot be deciphered after the first key is discarded.

13. A non-transitory computer-readable storage medium storing instructions that, when executed by a processor of a device, cause the processor to:
decrypt data read from a volume iteratively using a first key until an entirety of the volume is decrypted using the first key, wherein the volume includes a plurality of blocks and the first key is to be different for at least two of the blocks based on a logical block address (LBA) of the block;
encrypt the decrypted data using a second key, wherein at least one of the first and second keys are to be different for different volumes included in one or more drives;
write the encrypted data back to the volume; and
at least one of encrypt data to and decrypt data from a location of the volume requested by an access request from a host using at least one of the first and second keys, wherein
the first key is used in response to the access request if the location has not been decrypted using the first key and encrypted using the second key, and
the second key is used in response to the access request if the location has been decrypted using the first key and encrypted using the second key.

14. The non-transitory computer-readable storage medium of claim 13, wherein,
the data read from the volume that is decrypted includes plaintext data, and
the first key is discarded after all blocks of the volume are decrypted using the first key and encrypted using the second key.

* * * * *